United States Patent [19]

Hayashi

[11] 4,167,552

[45] Sep. 11, 1979

[54] THERMOSETTABLE RESIN MOLDING COMPOUND

[75] Inventor: Tadahiko Hayashi, Chiba, Japan

[73] Assignee: Asahi Glass Company, Ltd., Tokyo, Japan

[21] Appl. No.: 834,264

[22] Filed: Sep. 19, 1977

[30] Foreign Application Priority Data

Sep. 24, 1976 [JP] Japan .................................. 51-113710

[51] Int. Cl.² .............................................. B29G 3/00
[52] U.S. Cl. ................................ 264/328; 260/40 R; 264/329
[58] Field of Search ...................... 428/407; 260/40 R; 264/4, 328, 329

[56] References Cited

U.S. PATENT DOCUMENTS

| | | | |
|---|---|---|---|
| 2,834,741 | 5/1958 | Bleuenstein | 428/407 |
| 3,302,410 | 2/1967 | McLean | 260/22 X |
| 3,336,155 | 8/1967 | Rowe | 428/407 |
| 3,429,827 | 2/1969 | Ruus | 264/4 X |
| 3,462,514 | 8/1969 | Kurkowski et al. | 260/861 |
| 3,792,020 | 2/1974 | Huck et al. | 264/4 X |
| 3,823,219 | 7/1974 | Ward et al. | 264/328 X |
| 3,959,209 | 5/1976 | Lake | 260/861 X |
| 3,971,863 | 7/1976 | Calkins | 428/407 |

*Primary Examiner*—Sandra M. Person
*Attorney, Agent, or Firm*—Oblon, Fisher, Spivak, McClelland & Maier

[57] ABSTRACT

A thermosettable resin molding compound for pressure-molding comprises a relatively thin nontacky coat formed on a surface of a solid molding composition comprising a liquid thermosettable resin and a filler.

8 Claims, No Drawings

4,167,552

THERMOSETTABLE RESIN MOLDING COMPOUND

BACKGROUND OF THE INVENTION

1. Field of the Invention

The present invention relates to a thermosettable resin molding compound containing a filler and a process for preparing the same. More particularly, it relates to a prepreg or primix having nontacky surface which comprises a liquid thermosettable resin and a process for preparing the same.

2. Description of Prior Arts

The thermosettable resin molding compounds comprising a reinforcing filler such as reinforcing fibers and a powdery filler such as calcium carbonate are classified to a prepreg and a premix.

The prepreg is prepared by immersing a reinforcing fiber in a thermosettable resin compound. The premix is prepared by blending a reinforcing fiber to a thermosettable resin.

When a liquid thermosettable resin is used as the thermosettable resin for the prepreg or premix, there have been the problems of the volatility of the component of the liquid thermosettable resin and the tackiness of the surface of the molding compound. For example, in the case of a prepreg comprising a styrene crosslinking type unsaturated polyester, the viscosity of the unsaturated polyester has been increased to deteriorate the fluidity and the surface is coated with a nontacky inert film to use the molding compound after peeling off the film in order to overcome the problems. This type of sheet is called as SMC.

On the other hand, the bulk molding compound called as BMC has been known as a premix. BMC is bulk molding compound which is prepared blending styrene crosslinking type unsaturated polyester resin to a large amount of a powdery filler and a reinforcing fiber and increasing the viscosity of the mixture. When it is stored for a long time, BMC is covered with an inert film as the same with the case of SMC. However, it has been required to peel off the film when it is used for the molding and this is disadvantage in the case of a mass production.

In the case of the premix or prepreg prepared by using a solid thermosettable resin (it is in a form of solid at room temperature) such as an unsaturated polyester with a solid crosslinking agent, pellets of the molding compound are used. In the case of the premix prepared by mixing a phenol resin with a filler, pellets of the molding compound are also used. The pellets are easily handled and can be used for a continuous molding process by an injection molding machine advantageously. However, it has not known to use pellets of the molding compound prepared by using a liquid thermosettable resin (at room temperature), because the pellets of the molding compound have large surface area to vaporize a large amount of volatile matters such as styrene and the pellets are adhered each other to form a bulk. The handling is not easy and the molding could not be attained by an injection molding machine without a special feeding device. When pellets are prepared by said method of preparing BMC, it is necessary to cover pellets of the molding compound with the inert film for each pellet and to peel off the inert film before the molding the pellets. This operation is not easy and it is impossible in the practical industrial operation.

It has been considered to be remarkably advantageous that the pellets of the molding compound having nontacky surface can be obtained by using the liquid thermosettable resin such as the styrene crosslinking unsaturated polyester. The pellets of the molding compound can be used for a continuous molding by the conventional injection molding machine with the advantages of the improvement of the processability such as molding velocity; and no requirement of peeling-off of the inert film in the injection molding as well as the compression molding; and the improvement of storage of the molding compound; and a decrease of the cost in comparison with the molding compound prepared by using the solid thermosettable resin. When the molding compound is used for the compression molding, the operation for cutting the mass of the molding compound and weighing desired amount can be eliminated to improve the efficiency for the molding.

The inventor has studied on pellets of molding compound prepared by using a liquid thermosettable resin and has found the molding compound which can be prepared without using an inert film which is peeled off but coating the surface of the molding compound with a nontacky coat for preventing tackiness of the surface and using the molding compound without peeling off the nontacky coat.

SUMMARY OF THE INVENTION

It is an object of the present invention to provide a thermosettable resin molding compound used for a pressure molding which has not tackiness and blocking property and can be a form of pellets.

It is another object of the present invention is to provide a process for preparing the thermosettable resin molding compound having no tackiness and no blocking property.

It is the other object of the present invention to provide a molding method by using the thermosettable resin molding compound.

The foregoing and other objects of the present invention have been attained by providing a relatively thin nontacky coat formed on a surface of a solid molding compound comprising a liquid thermosettable resin and a filler.

DETAILED DESCRIPTION OF THE PREFERRED EMBODIMENTS

The characteristics of the molding compound of the present invention are to be the premix or prepreg having suitable form such as pellets or bulk which is prepared by using a liquid thermosettable resin especially a styrene crosslinking type unsaturated polyester resin and coating a nontacky coat on the surface of the molding compound by coating a synthetic resin or a solution or dispersion thereof or a monomer or a prepolymer being convertible to a liquid thermosettable resin or a synthetic resin and then curing or polymerizing it on the surface of the molding compound or forming a nontacky coat formed on the tacky surface of the molding compound by means of forming the nontacky coat.

The molding compound of the present invention is especially suitable for preparing the molding compound in the form of pellets.

It has been known that the molding compound comprising a liquid thermosettable resin can be obtained as BMC in a form of bulk or SMC in a form of sheet. In accordance with the present invention, the molding compound in the form of pellets can be obtained. The discrimination of pellets from the bulk and sheet may be not clear. In the present invention, the pellets are defined to have a weight of less than 20 g especially less than 10 g per one piece and to prepare a molded article having a weight of more than several times of the weight of one piece by using a plurality of pellets. In the case of BMC, one bulk is used for molding one molded article. In the case of SMC, suitable amount of the molding compound is cut out from a long sheet of SMC.

Of course, the present invention can be applied for BMC, SMC or the other molding compound and is not confined to the pellet molding compound.

The present invention is also to prepare the molding compound. The BMC, SMC or the pellet molding compound prepared by the conventional method of preparing pellet molding compound of the solid thermosettable resin or the other shaped molding compound is treated to form the nontacky coat on the surface thereof.

Heretofore, the molding compound has been prepared on a nontacky film such as a synthetic film or the molding compound has been covered with a nontacky film. However, in these conventional methods, a thin film could not be used because it is difficult to prepare it and to peel off it.

However, in accordance with the present invention, it is preferable to form a thinner coat because it is not necessary to peel off and the effect of the coat to the molded article is less by using a thinner coat.

In the method of providing the thin coat on the surface of the molding composition, it is preferable to form the coat on the surface of the molding composition by a surface treatment.

The optimum nontacky coat is the synthetic resin coat, which can be formed by a method of forming the coat by coating a solution or dispersion of the synthetic resin and drying it or a method of forming the coat by coating a liquid thermosettable resin or a monomer or prepolymer of thermosettable resin and then curing or polymerizing it etc.

The present invention will be further illustrated in detail by the typical examples using a styrene crosslinking type unsaturated polyester as the liquid thermosettable resin and a synthetic resin coat as the nontacky coat.

The thermosettable resin composition used in the present invention mainly includes the unsaturated polyester, styrene, a polymerization catalyst and a filler.

The fillers can be a reinforcing filler such as reinforcing fiber or a filler used for the phenol resin type premix or the other type premix such as saw dust, or the other filler such as calcium carbonate, clay or the powdery filler used in the conventional BMC or SMC.

The other additives such as a viscosity increasing agent, a shrinkage lowering agent, a coloring agent, a parting agent, a stabilizer, a flameproofing agent or others can be used as desired.

The molding compound in the form of pellets, bulk or sheet etc. is prepared by mixing these components in the process for preparing BMC or SMC etc. and then, coating it by the surface treatment as described below. It can be also prepared by molding the molding compound in a form of strand etc. by an extrusion or a drawing and continuously coating the strand by a surface treatment and then cutting the strand in the form of pellets or others.

In order to continuously carry out the surface treatment in high efficiency. The latter is preferable. In the preparation of the molding compound in the form of pellets, it is relatively difficult to carry out the surface treatment after pelletizing it. It is preferable to prepare the molding compound in the form of pellets by extruding to form a premix or drawing to form a prepreg by a method of coating of glass fiber rovings and then, coating the strand by the surface treatment and cutting the strand.

The surface treatment is preferably carried out by using a material for forming the synthetic resin coat. When the synthetic resin is a thermoplastic resin, it is coated in the form of the thermoplastic resin, a solution or a dispersion of thereof. In the case of the thermoplastic resin itself, it is coated after melting it or it is coated in a form of powder and then the coat is formed by means of heating. However, when it is heated at high temperature, the thermosettable resin in the molding compound may be cured. Accordingly, it is preferable to use the solution or dispersion of the thermoplastic resin. The coat can be easily formed on the surface of the molding compound by coating the solution of the thermoplastic resin on the surface of the molding compound and removing the solvent.

When the dispersion such as an emulsion or suspension is used, the coat is formed by removing the medium and treating it by a heat treatment, a solvent treatment or the other manner.

When the liquid thermosettable resin is used, the coat is formed by coating the thermosettable resin and curing it. In the curing operation, it is disadvantage to cure the thermosettable resin in the molding compound. Accordingly, when it is cured by the heat curing or high frequency heat curing operation, it is preferable to use the thermosettable resin having a curing temperature lower than that of the thermosettabler resin in the molding compound. It is preferable to use the coat by coating an ultraviolet ray polymerizable type or other photopolymerizable thermosettable resin and to cure the coated photopolymerizable resin. In the operation, a solvent can be used.

It is also possible to form the coat by using a monomer or prepolymer of a thermoplastic resin such as methyl methacrylate and polymerizing it on the surface of the molding compound.

It is also possible to use styrene monomer which can be styrene contained in the molding compound. When styrene is contained in the molding compound, styrene is migrated on the surface of the molding composition. Accordingly, the migrated styrene can be polymerized to form a coat. When a gel is formed for the coat, a gel forming powder such as dibenzylidene sorbitol, aluminum stearate or a partial cured unsaturated polyester etc. is added because the gel is not formed by the simple surface treatment with the filler.

It is preferable to form the relatively thinner coat. The molding compound is contaminated with the coat in the molding operation. When a large amount of the synthetic resin is included, an adverse effect is imparted to the molding compound.

However, when the synthetic resin coat is thermoplastic resin, the effect is the filler or the shrinkage lowering agent for the molding compound can be expected.

For example, when a thermoplastic resin is incorporated as the shrinkage lowering agent in the molding compound, it is possible substitute a part or whole of the shrinkage lowering agent by the thermoplastic resin for the coat. The coat should have only effects for preventing a vaporization of styrene and imparting nontackiness whereby it is unnecessary to be high molecular weight polymer or to have high mechanical strength.

When the coat is formed by the thermosettable resin and the thermosettable resin can be the same with or similar to the thermosettable resin in the molding compound, the compatibility in the molding operation is excellent to obtain a uniform molded article.

When the coat is formed on the surface of the molding compound, it is not always necessary to coat the coating material. For example, it is possible to form the coat by using a styrene crosslinking type unsaturated polyester which can be cured by the irradiation of ultraviolet rays and by heat treatment and irradiating ultraviolet rays on the surface of the molding compound to cure only the surface.

The method of forming the coat on the surface of the molding compound is not confined and it can be a method of dipping the molding compound in a form of pellets into a solution of the coating material and a method of coating the coating material etc. The effective method is to form the coat by molding the molding compound in a form of strand and passing the strand through the solution of the coating material and taking up and drying it or polymerizing it and cutting the treated strand. The cutted surface is not coated with the coat, however the area of the cutted surface is small, moreover, the cutted surface is usually knipped. Accordingly, the effect of the cutted surfaces can be neglected.

The nontacky coat is relatively thin and it is not confined. It is preferable to be the same or less than the thickness of the inert film used for preparing the SMC. The inert film used for the SMC should be peeled off before using it for the molding operation, whereby it is necessary to have enough strength not to be teared and to have enough thickness. In the present invention, it is unnecessary to peel off it, the coat can be thin. The thickness of the coat is depending upon the kind of the coat and is preferably less than $50\mu$ especially less than $10\mu$.

The molding compound in a form of pellets prepared by using the styrene crosslinking type unsaturated polyester have been illustrated. Thus, the present invention can be applied for the bulk of the molding composition.

That is, the premix or prepreg of the BMC or SMC is treated to form a coat of synthetic resin by the surface treatment whereby the nontacky surface can be obtained.

In accordance with the present invention, the operation for covering the molding compound with the inert film and peeling off the inert film before molding it, and the storage of the molding compound can be improved.

The other characteristics of the present invention are to provide the molding method. That is, the molding compound is used for the molding operation without peeling off the nontacky coat formed on the surface of the molding compound. Since the peeling off step is eliminated, the efficiency for molding is remarkably improved. The peeling off step which is manually operated is eliminated whereby the continuous automatic molding process can be employed.

The pressure molding methods include the compression molding, the transfer molding and the injection molding which have been used for the molding of the premix. When it is necessary to throughly mix the nontacky coat with the molding composition, the injection molding is the optimum. When the nontacky coat can be ununiformly remained on or in the molding composition, or the nontacky coat is uniformly dispersed in the molding compound in the molding operation by heating etc., the other pressure-molding method can be employed.

The liquid thermosettable resins used as the starting material for the molding compound can be various types and preferably the styrene crosslinking type thermosettable resins such as the styrene crosslinking type unsaturated polyester resins and vinyl ester resins. The styrene crosslinking type unsaturated polyester resins are the optimum because suitable kind of the resin can be selected depending upon the purpose and the resins are relatively economical.

The other liquid styrene crosslinking type thermosettable resins and the other liquid crosslinking agents can be also used. The other liquid crosslinking agents can be diallylphthalate, vinyl toluene, halostyrenes, methacrylic esters etc. In the molding compound containing the liquid thermosettable resin, a polymerization catalyst for the curing and a filler are added.

Suitable fillers include calcium carbonate, alumina, alumina hydrate, talc, clay, diatomaceous earth, glass powder, vermiculite, microballon, other powdery fillers. One or more fillers can be incorporated.

The other additives such as a shrinkage lowering agent, a viscosity increasing agent, a coloring agent, a parting agent, a stabilizer, a flameproofing agent or others can be incorporated in the liquid thermosettable resin composition. The viscosity increasing agent such as an alkaline earth metal hydroxide or oxide and the shrinkage lowering agent such as a thermoplastic resin are usually incorporated. When the photopolymerizable resin is used, various photosensitizers can be incorporated.

Suitable reinforcing fibers which are preferably combined with the powdery filler as a part of the filler, include glass fiber, carbon fiber, asbestos, ceramics fiber, metallic fiber, other inorganic fibers, synthetic fibers, animal and plant fibers and other organic fibers. One or more fibers can be used. It is especially preferable to incorporate the glass fiber or the synthetic fiber. From the viewpoint of the mechanical strength and chemical property, it is optimum to incorporate the glass fiber.

The reinforcing fiber can be incorporated by cutting and mixing it with the liquid thermosettable resin composition or it can be incorporated by coating the liquid thermosettable resin on the continuous filaments or relatively long filaments of the fiber and cutting the coated one in suitable length.

Suitable granular fillers include saw dust and other organic or inorganic reinforcing fillers.

The synthetic resin used for the synthetic resin coat are not confined. Suitable thermoplastic resins include polyolefin type resins such as polyethylene and polypropylene; polystyrene type resins such as polystyrene, ABS and AS; polyvinylchloride type resins such as polyvinylchloride, polyvinylidenechloride, vinylchloride copolymers; polyvinylacetate type resins such as polyvinylacetate, polyvinylalcohol, vinylacetate copolymers; acryl type resins such as polymethacrylic esters; polyamide type resins such as nylon 66, nylon 6; polyester type resins such as polyethyleneterephthalate; cellulose type resins such as cellulose acetate, cellophane; polycarbonate type resins, polyurethane type resins etc. One or more thermoplastic resins can be used. The resins can be used when they have the film-forming property. As described above, the resin can be used by itself or in a form of solution or dispersion.

Suitable thermosettable resins include unsaturated polyester resins, vinyl ester resins, epoxy resins, allyl resins, silicone resins, etc. The liquid thermosettable resin is preferably used by itself or in a form of solution. The solid thermosettable resin is preferably used in a form of solution. The curing characteristics of the thermosettable resin can be varied depending upon not only the kind of the resin but also the kind and amount of the catalyst for the curing. The coat of the thermoset resin is formed on the surface by the means for heating or other means.

When the photopolymerizable resin (it is usually a synthetic resin composition comprising a thermosettable resin, a photosensitizer and other additives or a modified thermosettable resin) is used, the resin is cured by irradiating ultraviolet rays etc. When the photopolymerizable resin is used, only surface can be selectively cured without a trouble. Accordingly, it is optimum to use the photopolymerizable resin for the synthetic resin coat.

The monomers or prepolymers of the thermoplastic resins such as methacrylates and styrene can be used as the same with the thermosettable resins.

The other synthetic resin compositions used for coatings or paints can be also used for forming the synthetic resin coat.

The other additives such as a thixotropic property improver, a filler, a viscosity increasing agent and others can be also incorporated.

Natural resins and other natural compounds having the film forming property such as gelatin gas be also used as the materials for forming the nontacky coat. The natural compound can be used by itself or by combining with the synthetic resin.

The present invention will be further illustrated by certain examples, which are provided for purpose of illustration only and are not intended to be limiting unless otherwise specified.

EXAMPLE 1

A. Preparation of Composition

Styrene type unsaturated polyester (styrene content: 30 wt.%): 40 wt. parts
$CaCO_3$: 30 wt. parts
Talc: 10 wt. parts
Glass fiber (length ¼"): 15 wt. parts
MgO: 1.6 wt. parts
BPO: 0.8 wt. parts
Zinc stearate: 1.2 wt. parts The components were throughly blended and kneaded in a double arm type kneader for 30 minutes to obtain a paste (hereinafter referring to as P-1).

B. Granules

Suitable amount of P-1 was held between two sheets of cellophane and it was compressed in a platen of a press with a spacer having a thickness of 2 mm, to obtain a disc having a thickness of 2 mm. The disc covered with cellophane was put in a closed vessel for aging at 20° C. for 24 hours to increase the viscosity. The cellophane was removed from the aged disc and the disc was cut in a length and width of 2 mm to obtain square pellets having each length of 2 mm.

C. Surface Treatment

The surface of pellets was wetted with an ethylene chloride solution containing 4.4 wt.% of adipic acid chloride and then, the surface of pellets was further wetted with a water-alcohol solution (50:50) containing 1.3 wt.% of hexamethylenediamine thereby forming nylon 66 coat on the surface of the pellets. The pellets were washed with a water-alcohol solution containing 1 wt.% of HCl and with an aqueous solution of $NaHCO_3$ and the pellets were dried at lower than 60° C. to obtain molding pellets.

EXAMPLE 2

P-1 was passed through a screw type extruder (L/D=16; compress ratio of 1.2) at 70° C. to continuously extrude in a form of rod having a diameter of 5 mm. The rod was dipped in an emulsion of polyvinylidene chloride and it was taken up and dried and cut in a length of 10 mm. The resulting pellets had non-tacky coat of polyvinylidene chloride and no blocking of the pellets was caused.

EXAMPLE 3

P-1 was passed through the screw type extruder of Example 2 at 70° C. to continuously extrude in a form of strand having a diameter of 10 mm. The strand was dipped in the following solution.

Sodium alginate: 1.0 wt.%
Polyvinyl alcohol: 3.0 wt.%
Gelatin: 0.3 wt.%
Glycerine: 3.0 wt.%
Water-alcohol (50%): 96.7 wt.%

The strand was taken up and it was wetted with an aqueous solution containing 10 wt.% of $CaCl_2$ and it was dried and cut in a length of 15 mm to obtain a molding pellets having non-tacky coat of PVA.

EXAMPLE 4

P-1 was passed through the screw type extruder of Example 2 at 70° C. to continuously extrude in a form of strand having a diameter of 3 mm. The strand was cut in a length of 6 mm to form pellets. The pellets were mixed with the following partial cured insaturated polyester powder and the pellets were separated from the powder by sieving. The styrene component adhered on the surface of pellets was gelated whereby non-tacky coat was formed and no blocking of the pellets was caused.

Preparation of Partial Cured Unsaturated Polyester Powder

A water in oil type emulsion was prepared by gradually adding 100 wt. parts of water to a mixture of 100 wt. parts of unsaturated polyester resin 5 wt. parts of triethanolamine, 2 wt. parts of cobalt octenate and 0.4 wt. part of dimethylaniline under vigorously stirring it. A mixture of 25 wt. parts of porous silica (specific gravity of 0.13 and particle diameter of 16 m$\mu$) and 100 wt. parts of water was added to the emulsion under stirring it, and then 0.4 wt. part of methylethylketone peroxide was added to the mixture. The precipitated partial cured unsaturated polyester was separated and dried to obtain the partial cured unsaturated polyester powder.

EXAMPLE 5

In accordance with the process of Example 4 except using di-benzylidene-D-sorbitol powder or a basic aluminum stearate powder instead of the partial cured unsaturated polyester powder, the molding pellets were prepared. When either of the powder was used, the non-tacky coat of styrene gel was formed and no-blocking of the pellets was caused.

EXAMPLE 6

In accordance with the process of Example 1 except using a commercial ultraviolet ray curable type unsaturated polyester resin (UV-260 manufactured by Nippon Gosei Kagaku K.K.) insted of the unsaturated polyester resin, the composition P-2 was prepared.

P-2 was passed through the secrew type extruder of Example 2 to extrude in a form of strand having a diameter of 10 mm. The strand was cut in a length of 5 cm to prepare pellets.

Ultraviolet rays were uniformly irradiated by rotating the pellets at the position of 25 cm below a 1 KW ultraviolet lamp.

As the result, only the surface of pellets was cured and no-blocking of the pellets was caused.

EXAMPLE 7

P-1 of Example 1 was passed through the extruder of Example 2 to continuously extrude strand having a diameter of 3 mm. The strand was coated with a commercial ultraviolet curable type unsaturated polyester resin (UV-100 manufactured by Nippon Gosei Kagaku K.K.). Ultraviolet rays were uniformly irradiated to the strand by the ultraviolet lamp of Example 6. When the surface of strand was changed to non-tacky, the strand waas cut in a length of 3 mm to obtain the pellets. Non-blocking of the pellets was caused.

EXAMPLE 8

Styrene type unsaturated polyester (styrene content: 30 wt.%): 60 wt. parts
$CaCO_3$: 30 wt. parts
Clay: 5 wt. parts
MgO: 2 wt. parts
Polymerization catalyst: 1.2 wt. parts
Zinc stearate: 1.8 wt. parts Glass rovings were continuously dipped into the above-mentioned liquid composition and were taken up and passed through an orifice having a diameter of 4 mm to control the amount of resin thereby forming a tacky prepreg. A commercial fast curable epoxy resin solution (Epotait) was spray-coated on the surface of the prepreg by a spray-coating and the coated prepreg was passed through a hot air at 80° C. thereby forming non-tacky cured epoxy resin coat on the surface. The coated product was cut in a length of 2.5 cm to obtain the pellets. Non-blocking of the pellets was caused.

EXAMPLE 9

Amounts of styrene component vaporized were measured. The molding pellets having the non-tacky coat or no non-tacky coat were kept at the room temperature for 24 hours in the atmosphere. The weight losses of the molding pellets were measured. The relative weight losses (%) were shown in Table 1.

Table 1

| | Relative weight loss (%) | |
|---|---|---|
| | molding pellets having no coat | molding pellets having coat |
| Example 1 | 3.0 | 1.2 |
| Example 2 | 3.3 | 0.5 |
| Example 3 | 4.0 | 0.8 |
| Example 5 | 4.5 | 1.8 |

Table 1-continued

| | Relative weight loss (%) | |
|---|---|---|
| | molding pellets having no coat | molding pellets having coat |
| Example 6 | 4.2 | 1.1 |
| Example 7 | 3.8 | 1.4 |

EXAMPLE 10

Injection Molding

The molding pellets of Examples 1, 6 and 8 were respectively extruded by the injection molding under the conditions of a screw part temperature of 80° C.; a mold temperature of 140° C.; a mold compressing force of 50 tons; an injection time of 6 seconds; and a curing time of 30 seconds thereby forming discs having a thickness of 3 mm and a diameter of 10 cm. The properties of the discs are shown in Table 2.

Table 2

| | Exp. 1 | Exp. 6 | Exp. 8 |
|---|---|---|---|
| Tensile strength (Kg/mm$^2$) | 3.3 | 4.1 | 7.9 |
| Bending strength (Kg/mm$^2$) | 7.4 | 8.8 | 14.6 |
| Izod impact strength (Kg · cm/cm) | 9.6 | 8.4 | 15.3 |
| Thermal deformation temperature (°C.) | >180 | >180 | >180 |
| Percent shrinkage in molding (%) | 0.1 | 0.6 | 0.4 |

EXAMPLE 11

Compress Molding

The pellets of Example 3 were pressed by a hot plate press molding at 140° C. for 1 hour to obtain a sheet having a thickness of 2 mm.

A test piece was cut out from the sheet and the test sample was tested by Japanese Industrial Standard.

As the result, the tensile strength was 4.5 Kg/mm$^2$; the bending strength was 14.4 Kg/mm$^2$ and the Izod impact strength was 9.6 Kg.cm/cm.

What is claimed is:

1. A method for screw injection molding an article which comprises:
   inserting into a screw injection molding apparatus a multiplicity of pellets each having a weight of less than 20 g; wherein said pellets comprise a liquid thermosettable resin composition and a filler, said pellets being surface-coated with a non-tacky coating of less than about 50 micron thickness and injecting said pellets without peeling off the non-tacky coat into a mold whereby said surface coating is sheared such that said liquid fills said mold whereby a molded article is formed having a weight of more than several times the weight of one pellet; and wherein said molded article contains said non-tacky coat uniformly and thoroughly mixed therein.

2. The method of claim 1 wherein the liquid thermosettable resin is a styrene cross-linking type unsaturated polyester.

3. The method of claim 1 wherein the filler is a filler powder and a reinforcing fiber.

4. The method of claim 3 wherein the reinforcing fiber is a glass fiber.

5. The method of claim 1 wherein the non-tacky coat is a synthetic resin coat.

6. The method of claim 5 wherein the synthetic resin coat is a thermoplastic resin coat.

7. The method of claim 5 wherein the synthetic resin coat is a thermosettable resin coat.

8. The method of claim 5 wherein the synthetic resin coat is a coat formed by curing a photopolymerizable resin.

* * * * *